Patented July 25, 1939

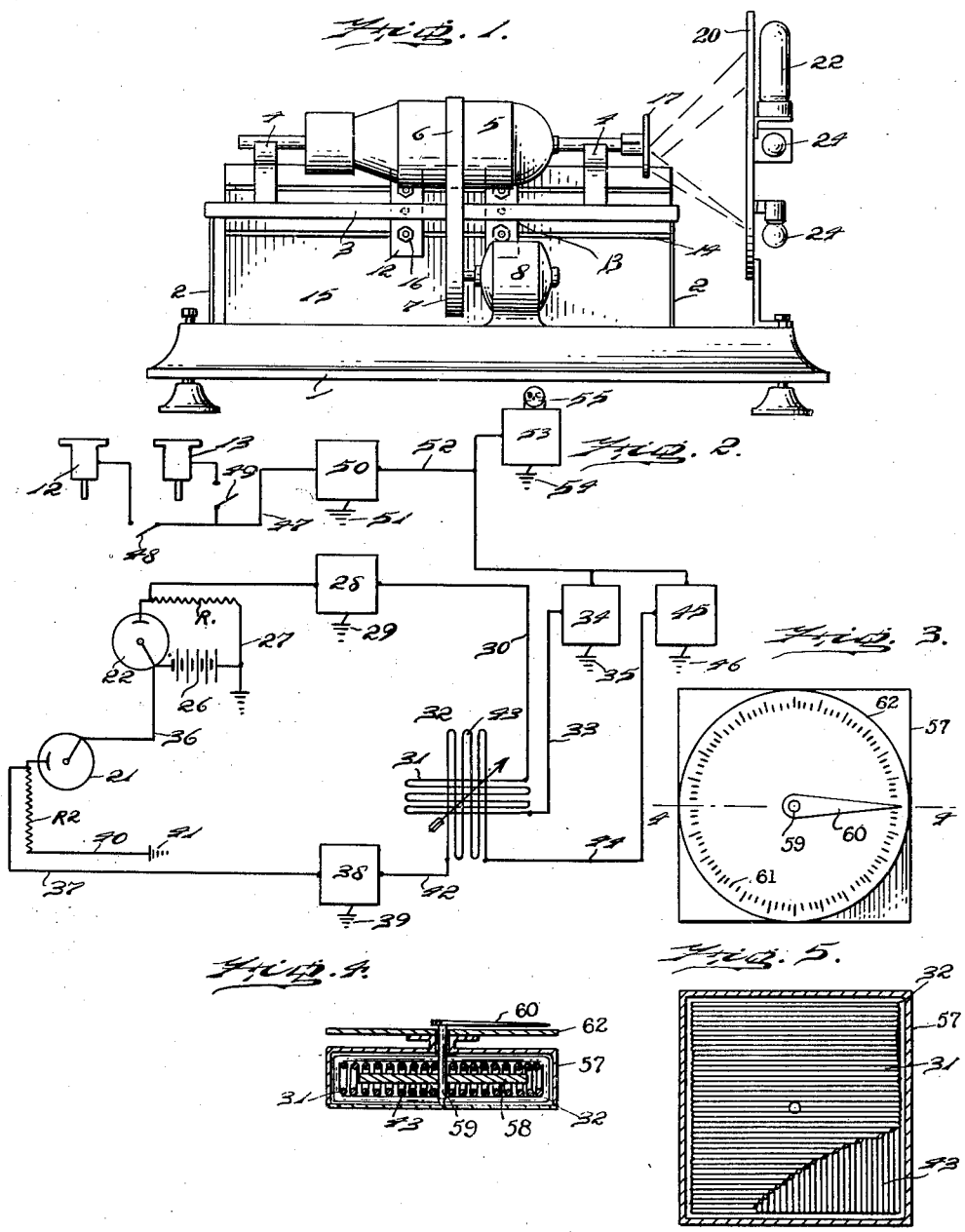

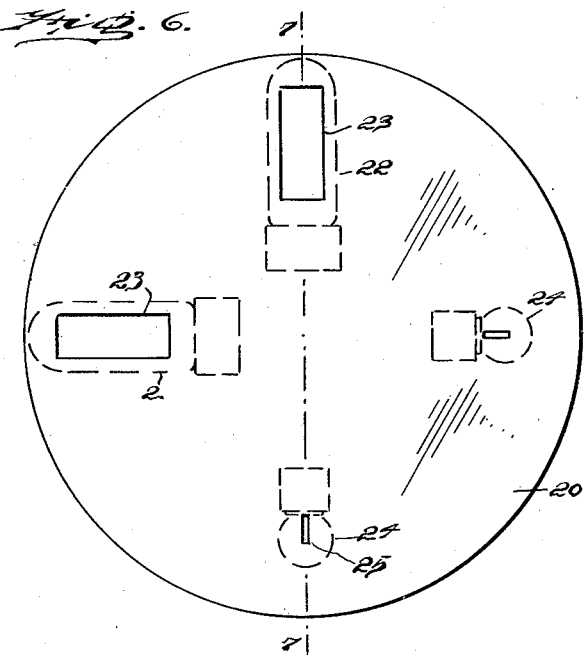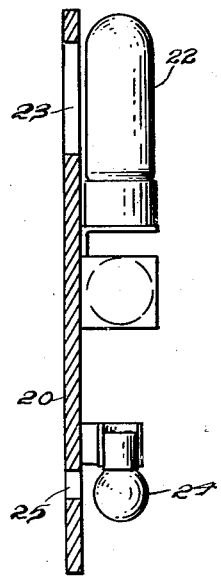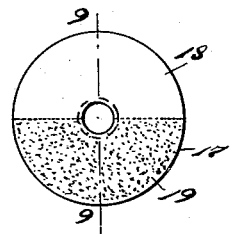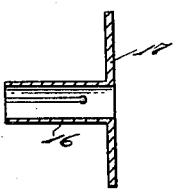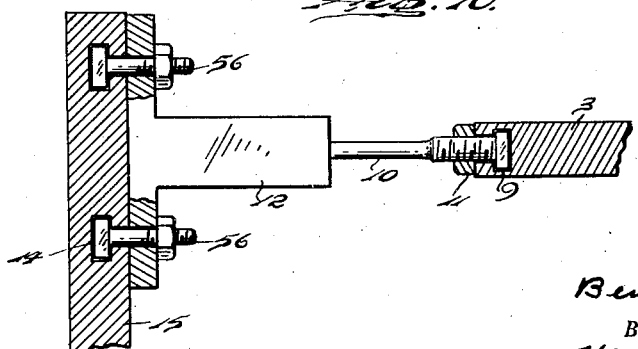

2,167,488

UNITED STATES PATENT OFFICE 2,167,488

MECHANISM FOR AUTOMATICALLY DETERMINING AND INDICATING UNBALANCE IN ROTATABLE BODIES

Bengt Erik Ohlson, Philadelphia, Pa., assignor to Tinius Olsen Testing Machine Company, Philadelphia, Pa., a corporation of Pennsylvania Application July 29, 1936, Serial No. 93,200

12 Claims. (Cl. 73—51)

The object of this invention is to devise novel mechanism for automatically indicating the amount and angle of unbalance of a rotatable body.

The pressures due to unbalanced forces in the rotatable body are exerted against piezoelectric pick-ups positioned in selected planes of correction.

Photo-tubes and their amplifiers are employed to supply plate voltage to rectifiers. These voltages are 90° out of phase and are created by light rays from sources of light spaced 90° apart and reflected from one half of a disc to the photo-tubes.

The disc is revolved in a definite speed relationship with the body and preferably by the rotatable body and at the same speed as the body. The currents passed by the photo-tubes are proportional to the sine and cosine of the phase angle between the pick-up voltage and the photo-tube's voltages. These currents are applied to two coils 90° apart and create a magnetic field which will indicate the unbalance by means of a pointer moving relatively to a graduated scale.

The angle indicated is in reference to a half reflecting portion of the disc revolved in unison with the revolution of the revolving body.

The amount of unbalance is automatically indicated in the plate circuit of a rectifier.

With the above and other objects in view, as will hereinafter appear, my invention comprehends novel mechanism for automatically indicating the amount and angle of unbalance of a rotatable body to be tested for unbalance.

It further comprehends a novel wiring diagram.

Other novel features of construction and advantage will hereinafter more clearly appear in the detailed description and the appended claims.

For the purpose of illustrating the invention, I have shown in the accompanying drawings a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a side elevation of a balancing machine in conjunction with which my novel means for automatically indicating the amount and angle of unbalance may be employed.

Figure 2 is a wiring diagram.

Figure 3 is a top plan view of an angle indicator.

Figure 4 is a section on line 4—4 of Figure 3.

Figure 5 is an elevation, partly broken away to show more clearly the 90° spacing of the winding of a coil of the angle indicator.

Figure 6 is an end elevation of a portion of the angle indicator.

Figure 7 is a section on line 7—7 of Figure 6.

Figure 8 is an end elevation of a reflecting disc.

Figure 9 is a section on line 9—9 of Figure 8.

Figure 10 is a partial section showing more particularly the manner in which the pick-ups are adjusted to be positioned in selected planes of correction.

Similar numerals indicate corresponding parts.

Referring to the drawings:

For the purpose of illustrating one type of balancing machine in conjunction with which my novel indicating mechanism can be employed, I have shown one corresponding to that shown in my copending application Serial No. 93,199. The balancing machine illustrated has a bed 1, which carries flexible supports 2, which support a vibratory frame or cradle 3, having mountings 4, on which the rotatable body 5 to be tested is placed. The rotatable body 5 is driven at a constant speed in any desired manner, and, as illustrated, has a belt 6 passing around it and around the pulley 7, on the shaft of an electric motor 8, carried by the base. The frame 3 has T shaped slots 9 to receive the T shaped heads of pressure transmitting members 10 secured in adjusted position relatively to the frame by nuts 11. These pressure transmitting members bear against piezoelectric pick-ups 12 and 13 which are longitudinally adjustable in T shaped slots 14 in a plate 15 carried by the bed and are secured in their adjusted position by fastening devices 56 in the form of T shaped shoes and nuts.

It will thus be clear that the pick-ups and pressure transmitting members can be positioned in selected planes of correction of the rotatable body to be tested.

The shaft of the rotatable body 5 or a shaft on which such body is mounted receives the split sleeve 16 of a reference disc 17 having one half of one of its faces forming a reflecting surface 18 and its other half forming a non-reflecting surface 19. The disc 17 is driven in unison with the body and at a definite speed relationship therewith. The bed 1 supports a plate 20 in the form of a disc having photo-tubes 21 and 22 spaced 90° out of phase and having light openings 23 through the plate 20 in rear of the photo-tubes. The plate 20 has light sources 24 connected with a source of electric supply mounted upon it and spaced 90° apart. The plate 20 has light openings 25 in rear of the light sources.

Referring now to the wiring diagram seen in Figure 2, the photo-tube 22 is connected with a source of electric supply 26 which is grounded by line 27. The line 27, having a resistance R' grounded by line 27, leads to an amplifier 28 grounded at 29. The amplifier 28 is connected by a line 30 with a winding 31 of a coil 32. A line 33 leads from the winding 31 to the plate of a rectifier 34, grounded at 35.

The photo-tube 22 is connected with the photo-tube 21 by line 36. A line 37 leads from the photo-tube 21 to an amplifier 38, grounded at 39, and has a resistance R2 in a line 40 grounded at 41. A line 42 leads from the amplifier 38 to a winding 43 spaced 90° apart from the winding 31, and this winding 43 is connected by line 44 with the plate of a rectifier 45, grounded at 46.

The electric pick-ups are selectively connected by a line 47, having switches 48 and 49, with an amplifier 50 grounded at 51. A line 52 leads from the amplifier 52 to the grid of a rectifier 53, grounded at 54, and having a D. C. meter 55 in its plate circuit which indicates the amount of unbalance of the rotatable body being tested. The line 52 is also connected with the grids of rectifiers 34 and 45. The angle indicator 57, within which the coil 32 is placed actuates an armature 58 on a shaft 59, suitably journalled, and connected with a pointer 60 which travels over the graduations 61 on a graduated disc 62.

The operation of my novel mechanism for automatically indicating the amount and the angle of unbalance of a rotatable body being tested will now be apparent to those skilled in this art and is as follows:

Assuming that the rotatable body to be tested is mounted in the machine, and the electric pick-ups have been adjusted to be positioned in selected planes of correction, the motor is started and the body to be tested is revolved at a constant speed.

The unbalanced forces in the body will cause the members 10 to exert pressures against the piezoelectric pick-ups to thereby cause them to create voltages. As these voltages are very small, it is necessary to amplify them.

The switch 48 or 49 is closed in accordance with the plane of correction in which the unbalance is to be determined.

The reference disc 17 is fixed to the shaft of the rotatable body to be tested or to the shaft on which it is mounted, so that such disc is revolved in definite speed relationship with the speed of revolution of such body. As the disc 17 revolves, light rays will be reflected from the light sources 24 by the reflecting surface 18 of the disc 17 to the photo-tubes 21 and 22 which will create voltages in said photo-tubes.

The amplifiers 25 and 38 supply plate voltages from the photo-tubes to the plates of the rectifiers 34 and 45, and these voltages are 90° out of phase. The pick-up voltage is connected to the grids of the rectifiers 34 and 45. Thus the currents passed by the two rectifiers are proportional to the sine and cosine of the phase angle between the pick-up voltage and the photo-tube voltages.

These currents applied to two windings 90° apart create a magnetic field the direction of which indicates on the angle indicator the angle of unbalance. This angle is indicated by the pointer 49 and graduations 50. The amount of the unbalance is indicated on the D. C. meter 55 in the plate circuit of the rectifier 53. The amount and angle of unbalance for each plane of correction is determined in the same manner and the correction is applied to the body under test in the usual and conventional manner, now well known in this art.

The balancing machine may be of any desired or conventional construction in which the body to be tested is rotated at a constant speed, and the type herein shown, in which a fixed pivot for vibratory movements of the frame is not used, has been shown only for the purpose of illustrating one manner of carrying out in practice this invention.

The amplifier 50 amplifies the output from the piezo crystals 12 and 13. The voltage from the crystals is a sine wave as will now be explained.

The vibratory frame 3 is free to vibrate but is checked by the piezo crystals 12 and 13 and their mountings.

The frame vibrates in such a manner that the displacement at any time is $s = S$ sine $wt$, and $w = 2\pi + f$. S equals amplitude value of displacement, $t$ equals time and $f$ equals the frequency or $$\frac{RPM}{60}$$

The counteracting force to check these vibrations is exerted by the crystals, and we have a force P as follows:

$p = P$ sine $(wt+\phi)$, because of pure elastic deformation giving proportionality between displacement and force, where $\phi$ is an unknown angle, P is the amplitude value of this force and $p$ is the instantaneous value of this force.

The voltage e generated by the crystals is proportional to the force or, $e = kP$ sine $(wt+\phi)$
$e = E$ sine $(wt+\phi)$
$E = kP$, the amplitude value of the voltage Therefore e is a sine wave.

The amplifiers 28 and 38 amplify the output from the photo-tubes 21 and 22.

The mechanical arrangement causes these photo-tubes to be square wave generators for the following reason:

In Figure 8 I have shown a rotating disc 17 having a reflecting face 18 to reflect the light and a non-reflecting face 19 to absorb the light. The disc 17 is rotating with the same angular velocity as the body to be balanced. During a one half rotation of the disc 17, the light from the light source 24 is directed against the non-reflecting face 19 and is absorbed, while during the other half of the rotation, the light is directed against the reflecting face 18 which reflects the light to the photo-tubes 21 and 22. The photo-tubes have the characteristic that they will pass current when they receive light and will not pass current when they do not receive light.

The photo-tubes will therefore pass current, i. e., the full current or no current will be passed. This is the characteristic of a square wave. The two waves are 90° apart.

The rectifiers 34 and 45 are arranged so that the current through the coil windings 31 and 43 will be a D. C. current, and, dependent on the relative phase angle between the square waves and the voltage from the piezo sets, and since they are 90° apart, one will be proportional to the sine of the angle and the other will be proportional to the cosine of the angle as will be clear from the following expanation:

The rectifiers 34 and 45 are so arranged that the current passing through them is proportional to the voltage applied to them from the crystal amplifier 50.

By using the square waves from the photo-tubes in such a way that they will block the current during the negative half of the cycle, we obtain at any time an instantaneous current proportional to the sine value or no current at all depending on:

a. Whether the sine wave is positive or not, or;
b. Whether the square wave is positive or not.

The mathematical result of this is an average current equal to the integral of the sine wave, with the square wave as integration limits.

This principle is explained in detail in the Sivertsen Patent No. 2,118,770, May 24, 1938, for Method of and apparatus for determining unbalance in rotatable bodies.

If the phase angle is $\varphi$, one current will be proportional to sine $\varphi$ and the other current will be proportional to the cosine $\varphi$.

Having thus described my invention, what I claim as new and desire to secure by Letters Patent is:

1. Mechanism for automatically indicating the angle of unbalance of a rotatable body, comprising a disc driven in definite speed relationship with the body and having one face divided into a reflecting and a non-reflecting surface, light sources spaced 90° apart, photo-tubes 90° out of phase receiving light reflected to them from said light sources by said disc, means to amplify voltages of said photo-tube, an angle indicator having a coil with windings spaced 90° apart receiving the amplified voltage, rectifiers to which voltages of said windings pass, electric pick-ups actuated by unbalanced forces in the rotating body, and means to amplify the voltage of a selected pick-up, and a rectifier electrically connected with the other rectifier and to which the amplified voltage of a selected pick-up is led.

2. Mechanism for automatically indicating the amount and angle of unbalance of a rotatable body, comprising a disc driven in definite speed relationship with the body and having one face divided into a reflecting and a non-reflecting surface, light sources spaced 90° apart, photo-tubes 90° out of phase receiving light reflected to them from said light sources by said disc, means to amplify voltages of said photo-tube, an angle indicator having a coil with windings spaced 90° apart receiving the amplified voltage, rectifiers to which voltages of said windings pass, electric pick-ups actuated by unbalanced forces in the rotating body, and means to amplify the voltage of a selected pick-up, a rectifier electrically connected with the other rectifier and to which the amplified voltage of a selected pick-up is led, and a meter in the plate circuit of the electric pick-up rectifier to indicate the amount of the unbalance.

3. Mechanism for automatically indicating the amount and the angle of unbalance of a rotatable body, comprising a disc revolved in unison with the body and having one half of one of its faces forming a reflecting surface and the other half a non-reflecting surface, photo-tubes disposed 90° out of phase and having light sources to reflect light therefrom to said photo-tubes to create voltages, amplifying means for said voltages, an angle indicator having coil windings spaced 90° apart and receiving said amplified voltages, electric pick-up, rectifiers having their plates receiving voltages from said windings, electric pick-ups, means to amplify the voltage of said pick-ups and pass it to the grids of said rectifier, a rectifier having its grid receiving pick-up voltage, and a meter in the plate circuit of said last named rectifier to automatically indicate the amount of unbalance.

4. Mechanism for automatically indicating the amount and the angle of unbalance of a rotatable body, comprising a disc revolved in unison with the body and having one half of one of its faces forming a reflecting surface and the other half a non-reflecting surface, photo-tubes disposed 90° out of phase and having light sources to reflect light therefrom to said photo-tubes to create voltages, amplifying means for said voltages, an angle indicator having coil windings spaced 90° apart and receiving said amplified voltages, electric pick-up, rectifiers having their plates receiving voltages from said windings, electric pick-ups, positionable in selected planes of correction of the rotatable body, means to amplify the voltage of said pick-ups and pass it to the grids of said rectifier, a rectifier having its grid receiving pick-up voltage, and a meter in the plate circuit of said last named rectifier to automatically indicate the amount of unbalance.

5. The herein described mechanism, comprising a reference disc revolved in speed relationship with a rotatable body to be tested for unbalance and having one half of one of its faces a reflecting surface and the other half a non-reflecting surface, photo-tubes 90° out of phase, means to reflect light from said reflecting surface to said photo-tubes to create voltages, an angle indicator having coil windings 90° apart to which amplified voltages from the photo-tubes are led, rectifiers having their plates connected with said voltages, electric pick-ups, and means to connect said pick-ups with the grids of said rectifiers.

6. The herein described mechanism, comprising a reference disc revolved in speed relationship with a rotatable body to be tested for unbalance and having one half of one of its faces a reflecting surface and the other half a non-reflecting surface, photo-tubes 90° out of phase, means to reflect light from said reflecting surface to said photo-tubes to create voltages, an angle indicator having coil windings 90° apart to which amplified voltages from the photo-tubes are led, rectifiers having their plates connected with said voltages, electric pick-ups, means to connect said pick-ups with the grids of said rectifiers, a rectifier having its grid selectively connected with said pick-ups, and a D. C. meter in the plate circuit of said last named rectifier.

7. In a balancing machine, a vibratory frame on which a rotatable body to be balanced is mounted, means to revolve said body at a constant speed, pressure transmitting members connected with the frame, piezoelectric pick-ups actuated by said members, a disc revolved in unison with said body having on one of its faces a half reflecting surface and a half non-reflecting surface, photo-tubes disposed 90° apart and having light sources to reflect light from said disc to said tubes, an angle indicator having windings 90° apart connected with said photo-tubes, and rectifiers receiving plate voltage from said photo-tubes and grid voltage from said pick-ups, and the windings of the indicator being connected between the photo-tubes and the rectifiers.

8. In a balancing machine, a vibratory frame on which a rotatable body to be balanced is mounted, means to revolve said body at a constant speed, pressure transmitting members connected with the frame, piezoelectric pick-ups actuated by said members, a disc revolved in unison with said body having on one of its faces a half reflecting surface and a half non-reflecting surface, photo-tubes disposed 90° apart and having light sources to reflect light from said disc to said tubes, an angle indicator having windings 90° apart connected with said photo-tubes, rectifiers receiving plate voltage from said photo-tubes and grid voltages from said pick-ups, and a rectifier having a D. C. meter in its plate circuit and having its grid connected with said electric pick-ups, and the windings of the indicator being connected between the photo-tubes and the rectifiers.

9. In a balancing machine, a vibratory frame on which a rotatable body to be balanced is mounted, means to revolve said body at a constant speed, pressure transmitting members connected with the frame, piezoelectric pick-ups actuated by said members, a disc revolved in unison with said body having on one of its faces a half reflecting surface and a half non-reflecting surface, photo-tubes disposed 90° apart and having light sources to reflect light from said disc to said tubes, an angle indicator having windings 90° apart connected with said photo-tubes, rectifiers receiving plate voltage from said photo-tubes and grid voltages from said pick-ups, and a rectifier having a D. C. meter in its plate circuit and having its grid connected with said electric pick-ups, and the windings of the indicator being connected between the photo-tubes and the rectifiers.

10. In a balancing machine, a vibratory frame on which the rotatable body to be tested is mounted, means to revolve said body at a constant speed, electrical pick-ups, means at selected planes of correction cooperating with said frame and pick-ups to actuate the latter to create currents proportional to unbalanced forces in the body, photo-tubes disposed 90° apart, optical means controlled by revolutions of said rotatable body to pass light to said photo-tubes, and means controlled by said photo-tubes and pick-ups to indicate the amount and angle of unbalance.

11. In a balancing machine, a pivotless vibratory frame on which the rotatable body to be tested is mounted, means to revolve said body at a constant speed, electrical pick-ups, means at selected planes of correction cooperating with said frame and pick-ups to actuate the latter to create currents proportional to unbalanced forces in the body, photo-tubes disposed 90° apart, optical means controlled by revolution of said rotatable body to pass light to said photo-tubes and means controlled by said photo-tubes and pick-ups to indicate the amount and angle of unbalance.

12. In a balancing machine, a vibratory frame having bearings on which a rotatable body to be tested is mounted, means to revolve said body at a constant speed, electric pick-ups adjustable longitudinally of the body to be positioned in selected planes of correction, adjustable members on the frame to transmit pressures, due to unbalanced forces in the rotatable body, to said pick-ups to cause the pick-ups to create voltages, means to amplify the pick-up voltages, a disc revoluble with said body, photo-tube amplifiers having voltages ninety degrees out of phase and created by light rays reflected from said disc, rectifiers to which plate voltages are supplied from said photo-tube amplifiers and having their grids adapted to be electrically connected with the amplified pick-up voltages, the currents passed by the rectifiers being proportional to the sine and cosine of the phase angle between the pick-up voltages and the photo-tube voltages, two coils ninety degrees apart to which said currents are applied to create a magnetic field, an indicator actuated by said magnetic field to indicate the angle of unbalance, a third rectifier having its grid connected to the grids of said first mentioned rectifiers and to the plate circuit of the amplifying means for the pick-up voltages, and a D. C. meter in the plate circuit of said third rectifier on which the amount of unbalance is readable.

BENGT ERIK OHLSON.